US010216764B2

(12) United States Patent
Matsuda et al.

(10) Patent No.: US 10,216,764 B2
(45) Date of Patent: Feb. 26, 2019

(54) IMAGE SEARCH APPARATUS, IMAGE SEARCH METHOD, AND SYSTEM

(71) Applicant: CANON KABUSHIKI KAISHA, Tokyo (JP)

(72) Inventors: Araki Matsuda, Kawasaki (JP); Yoko Hirotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1089 days.

(21) Appl. No.: 14/283,690

(22) Filed: May 21, 2014

(65) Prior Publication Data

US 2014/0351286 A1    Nov. 27, 2014

(30) Foreign Application Priority Data

May 27, 2013 (JP) .................................. 2013-111333

(51) Int. Cl.
*G06F 17/30* (2006.01)
*G06K 9/00* (2006.01)

(52) U.S. Cl.
CPC ... *G06F 17/30268* (2013.01); *G06K 9/00677* (2013.01)

(58) Field of Classification Search
CPC .............................................. G06F 17/30268
USPC ........................................................ 707/771
See application file for complete search history.

(56) References Cited

U.S. PATENT DOCUMENTS

| | | | | |
|---|---|---|---|---|
| 8,904,493 B1* | 12/2014 | Dibble | .................... | H04L 63/08 726/4 |
| 2004/0267740 A1* | 12/2004 | Liu | .................... | G06F 17/30256 |
| 2005/0140791 A1* | 6/2005 | Anderson | ............ | G11B 27/105 348/207.99 |
| 2012/0054658 A1* | 3/2012 | Chuat | ............... | G06F 17/30247 715/771 |
| 2012/0239506 A1* | 9/2012 | Saunders | ............... | G06Q 30/02 705/14.67 |

FOREIGN PATENT DOCUMENTS

JP        2007-293399 A        11/2007

* cited by examiner

*Primary Examiner* — Joshua Bullock
(74) *Attorney, Agent, or Firm* — Cowan, Liebowitz & Latman, P.C.

(57) ABSTRACT

An apparatus which searches for an image containing an object requested from a distribution destination apparatus, and manages an object of an image and a user of a distribution destination apparatus by categories; a unit which receives information about the user of the distribution destination apparatus and information about the requested object; a unit which determines a distribution destination user category to which the user of the distribution destination apparatus belongs; a unit which determines an object category to which the object requested from the distribution destination apparatus belongs; a unit which decides a search condition of an image based on the distribution destination user category and the object category; and a unit which searches for an image based on the decided search condition.

9 Claims, 9 Drawing Sheets

FIG. 3

| PERSON ID | PERSON NAME | CATEGORY | FACE FEATURE INFORMATION |
|---|---|---|---|
| ID001 | FATHER | FAMILY | ... |
| ID002 | DAUGHTER | FAMILY | ... |
| ID003 | ○○ | FRIENDS | ... |
| ID004 | △△ | FRIENDS | ... |
| ID005 | □□ | COLLEAGUES | ... |
| ID006 | ◇◇ | COLLEAGUES | ... |

| DISTRIBUTION DESTINATION ID | PERSON NAME | CATEGORY |
|---|---|---|
| User001 | FATHER | FAMILY |
| User002 | ○○ | FRIENDS |
| User003 | □□ | COLLEAGUES |

| RULE ID | CATEGORY | DISTRIBUTION RULE |
|---|---|---|
| Rule001 | FAMILY | All |
| Rule002 | FRIENDS | DISTRIBUTION DESTINATION USER AND OBJECT |
| Rule003 | COLLEAGUES | DISTRIBUTION DESTINATION USER CATEGORY = OBJECT CATEGORY |

| OBJECT ID (901) | OBJECT NAME (902) | CATEGORY (903) | FEATURE INFORMATION (904) |
|---|---|---|---|
| ID001 | FATHER | FAMILY | ... |
| ID002 | DAUGHTER | FAMILY | ... |
| ID003 | ○○ | FRIENDS | ... |
| ID004 | MT. FUJI | LANDSCAPE | MOUNT FUJI, Mt. Fuji |

FIG. 10

| RULE ID (1001) | CATEGORY (1002) | DISTRIBUTION RULE (1003) |
|---|---|---|
| Rule001 | FAMILY | DISTRIBUTION DESTINATION USER AND OBJECT |
| Rule002 | LANDSCAPE | All |

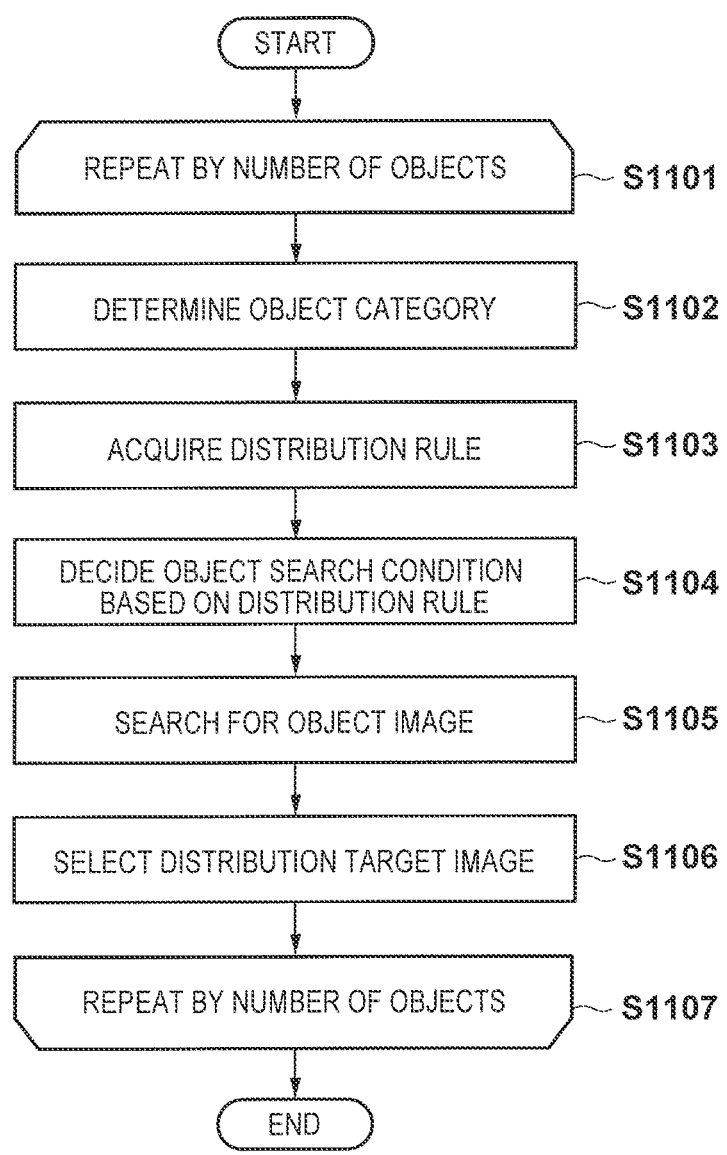

IMAGE SEARCH APPARATUS, IMAGE SEARCH METHOD, AND SYSTEM

BACKGROUND OF THE INVENTION

Field of the Invention

The present invention relates to an image search technique of searching for an image containing a predetermined object.

Description of the Related Art

Popularization of digital cameras and the like increases the opportunity to hold an enormous number of images personally. Along with this, a mechanism for easily sorting images when personally distributing images is being required. As a method of sorting and distributing images, for example, Japanese Patent Laid-Open No. 2007-293399 discloses a method of, when an acquired image contains a person, distributing it to a predetermined distribution destination in accordance with the person in a system in which a large number of images are shared between a plurality of users by using a network.

However, in Japanese Patent Laid-Open No. 2007-293399, a person at the distribution destination is decided based on a person recognition result at the distribution source, so the intention of the person at the distribution destination is not reflected. In search for an image to be distributed, an image complying with the intentions of persons at both the distribution destination and distribution source may not be searched.

SUMMARY OF THE INVENTION

The present invention has been made in consideration of the aforementioned problems, and realizes a technique capable of searching for an image complying with the intentions of both the user at the distribution destination and the user of the distribution source apparatus.

In order to solve the aforementioned problems, the present invention provides an image search apparatus which searches for an image containing an object requested from a distribution destination apparatus, comprising: a management unit configured to manage an object of an image and a user of the distribution destination apparatus by categories, respectively; a reception unit configured to receive, from the distribution destination apparatus, information about the user of the distribution destination apparatus, and information about the requested object; a user category determination unit configured to determine, based on the information about the user, a distribution destination user category to which the user of the distribution destination apparatus belongs; an object category determination unit configured to determine, based on the information about the object, an object category to which the object requested from the distribution destination apparatus belongs; a search condition decision unit configured to decide a search condition of an image based on a result of comparing the distribution destination user category with the object category; and an image search unit configured to search for an image based on the search condition decided by the search condition decision unit.

In order to solve the aforementioned problems, the present invention provides an image search apparatus comprising: a management unit configured to manage, respectively in association with category information, an object of an image stored in a storage medium and a browsing user; a setting unit configured to set the object serving as a search target; a specifying unit configured to specify the browsing user who is to browse a detected image; a decision unit configured to decide a search condition of an image by comparing a category associated with the object acquired by the setting unit, and a category associated with the browsing user specified by the specifying unit; and an image search unit configured to search for the image in the storage medium based on the search condition decided by the decision unit.

In order to solve the aforementioned problems, the present invention provides an image search method of searching for an image containing an object requested from a distribution destination apparatus by using object category information for managing an object for each category, and distribution destination user category information for managing a user of the distribution destination apparatus for each category, the method comprising: a reception step of receiving, from the distribution destination apparatus, information about the user of the distribution destination apparatus, and information about the requested object; a user category determination step of determining, based on the information about the user, a distribution destination user category to which the user of the distribution destination apparatus belongs; an object category determination step of determining, based on the information about the object, an object category to which the object requested from the distribution destination apparatus belongs; a search condition decision step of deciding a search condition of an image based on a result of comparing the distribution destination user category with the object category; and an image search step of searching for an image based on the search condition decided in the search condition decision step.

In order to solve the aforementioned problems, the present invention provides a system which searches for an image containing an object requested from a distribution destination apparatus, and transmits an image obtained as a result of search to the distribution destination apparatus, wherein an image search apparatus serving as a distribution source includes: a management unit configured to manage an object of an image and a user of the distribution destination apparatus by categories, respectively; a reception unit configured to receive, from the distribution destination apparatus, information about the user of the distribution destination apparatus, and information about the requested object; a user category determination unit configured to determine, based on the information about the user, a distribution destination user category to which the user of the distribution destination apparatus belongs; an object category determination unit configured to determine, based on the information about the object, an object category to which the object requested from the distribution destination apparatus belongs; a search condition decision unit configured to decide a search condition of an image based on a result of comparing the distribution destination user category with the object category; and an image search unit configured to search for an image based on the search condition decided by the search condition decision unit, and the distribution destination apparatus includes: a transmission unit configured to transmit information about the user of the distribution destination apparatus and information about the requested object; and a reception unit configured to receive the image obtained as a result of search by the image search unit of the image search apparatus.

In order to solve the aforementioned problems, the present invention provides an image search method of managing, respectively in association with category information, an object of an image stored in a storage medium and a browsing user, and searching for an image containing an object requested from the browsing user by using the category information, comprising: a setting step of setting the object serving as a search target; a specifying step of specifying the browsing user who is to browse a detected image; a decision step of deciding a search condition of an image by comparing a category associated with the object set in the setting step, and a category associated with the browsing user specified in the specifying step; and an image search step of searching for the image in the storage medium based on the search condition decided in the decision step.

According to the present invention, an image complying with the intentions of both the user at the distribution destination and the user of the distribution source apparatus can be searched for.

Further features of the present invention will become apparent from the following description of exemplary embodiments (with reference to the attached drawings).

BRIEF DESCRIPTION OF THE DRAWINGS

FIG. 3 is a table exemplifying object category information used in image search processing according to the embodiment;

FIG. 4 is a table exemplifying distribution destination user category information used in image search processing according to the embodiment;

FIG. 7 is a table exemplifying distribution rule information used in image search processing according to the second embodiment;

FIG. 9 is a table exemplifying object category information used in image search processing according to the third embodiment;

FIG. 10 is a table exemplifying distribution rule information used in image search processing according to the third embodiment; and FIG. 11 is a flowchart showing distribution image search processing according to the third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The first embodiment will describe an image sharing system which searches for an image containing an object requested from an image search apparatus at a distribution destination (to be also referred to as a distribution destination apparatus hereinafter), and transmits the image to the distribution destination apparatus. The image sharing system manages the object of an image at a distribution source (to be referred to as a distribution source apparatus hereinafter), and the user of the distribution destination apparatus (to be referred to as a distribution destination user hereinafter) by categories, respectively. If the category of a requested object and that of the distribution destination user coincide with each other, the distribution source apparatus decides an image of the requested object as a search condition. Further, the distribution source apparatus executes search for an image by using the decided search condition, and transmits an image serving as the search result to the distribution destination apparatus. Accordingly, only an image intended by the distribution destination user, out of images, can be transmitted to the distribution destination apparatus.

<System Configuration>

The configuration of the image sharing system including the image search apparatus for implementing the embodiment will be described with reference to FIG. 1.

Figure 1:
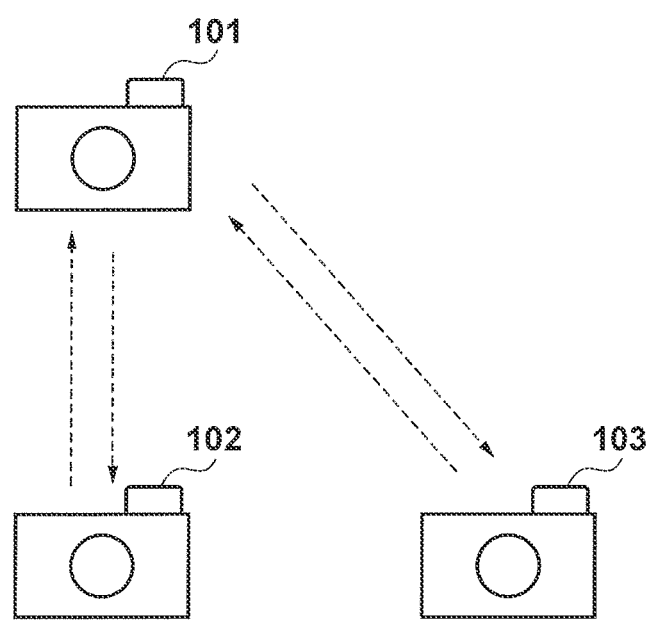
FIG. 1 is a view showing the configuration of an image sharing system according to an embodiment.

Referring to FIG. 1, the image sharing system according to the embodiment includes a plurality of image search apparatuses 101, 102, and 103. The image search apparatuses 101 to 103 are, for example, image capturing apparatuses such as digital cameras configured to shoot moving images and still images. Note that an example in which the image search apparatus according to the present invention is implemented by the image capturing apparatus will be explained. However, the present invention is also applicable to a portable electronic device such as a PDA or smartphone, and an information processing apparatus such as a personal computer (PC). At least one of the image search apparatuses constituting the image sharing system according to the present invention may be implemented by the above-mentioned portable electronic device or information processing apparatus.

For example, the distribution source apparatus 101 receives the ID of a distribution destination user and the name of a requested object from the distribution destination apparatus 102 or 103. Then, the distribution source apparatus 101 searches for an image by using a category (to be referred to as a distribution destination user category hereinafter) to which the distribution destination user belongs, and a category (to be referred to as an object category hereinafter) to which the object of an image possessed by the distribution source apparatus 101 belongs. The distribution source apparatus 101 transmits a distribution target image obtained as a result of search to the distribution destination apparatus 102 or 103.

<Apparatus Configuration>

Next, the configuration of the image search apparatuses 101, 102, and 103 constituting the image sharing system according to the embodiment will be described with reference to FIG. 2.

Figure 2:
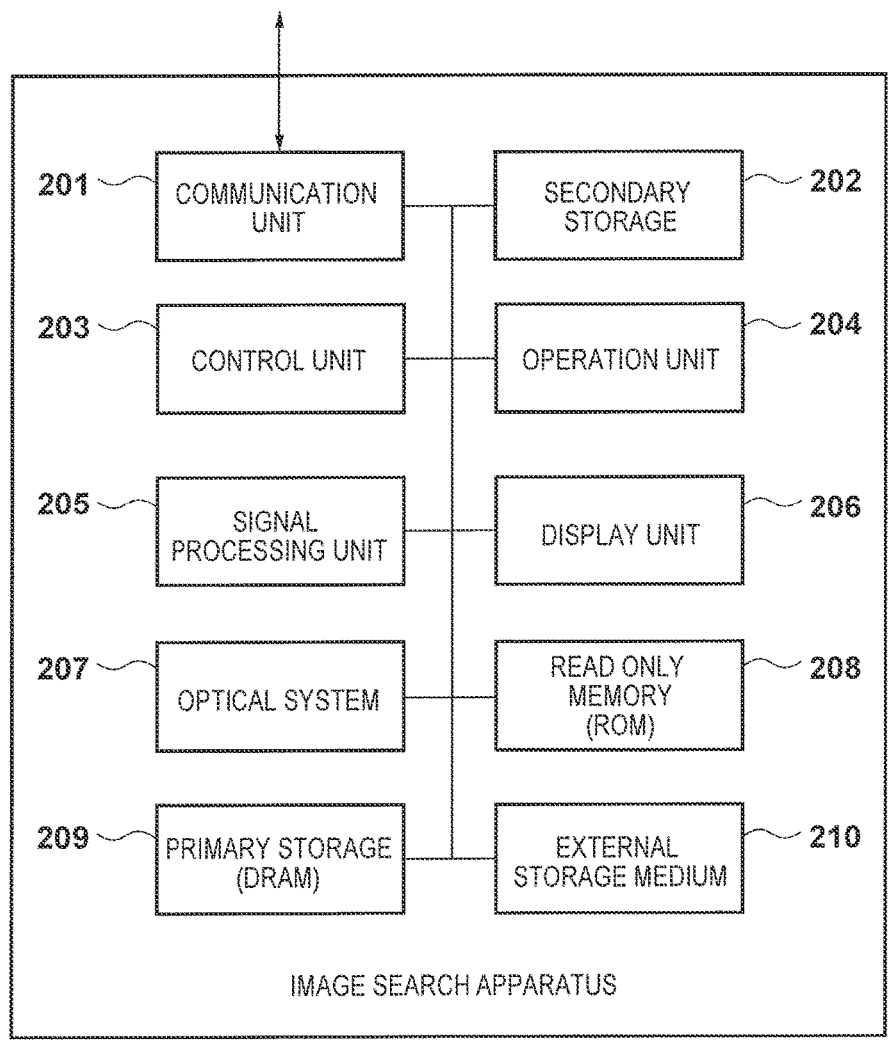
FIG. 2 is a block diagram showing the configuration of an image search apparatus according to the embodiment.

Referring to FIG. 2, each image search apparatus according to the embodiment includes a communication unit 201, secondary storage 202, control unit 203, operation unit 204, signal processing unit 205, display unit 206, optical system 207, read only memory 208, primary storage 209, and external storage medium 210.

The communication unit 201 is connected to another image search apparatus of the image sharing system or an external device to be able to communicate with it, and transmits/receives control commands and data. As a protocol for establishing a connection with the image search apparatus and communicating data, for example, PTP (Picture Transfer Protocol) or MTP (Media Transfer Protocol) is used. Note that the communication unit 201 may perform communication via a wired connection such as a USB (Universal Serial Bus) cable. The communication unit 201 may perform communication via a wireless connection such as a wireless LAN. Alternatively, the communication unit 201 may be connected to the image search apparatus directly or via a server or a network such as the Internet.

The secondary storage 202 is a hard disk drive or the like, and stores image files such as still images and moving images shot by the image search apparatuses 101 to 103, and databases (to be described later).

The control unit 203 includes a CPU configured to perform various arithmetic processes. The control unit 203 controls each unit of the image search apparatus and causes it to function as each unit (to be described later) in accordance with an operation signal input from the operation unit 204, and a program.

The operation unit 204 accepts a user operation. For example, a button, lever, and touch panel are usable.

The display unit 206 displays a viewfinder image upon shooting, a shot image, and a text for an interactive operation. The display unit 206 also presents a display when searching for and distributing an image. The display unit 206 is a display device such as a liquid crystal display or organic EL display.

The optical system 207 is constituted by a lens, shutter, and stop, and forms light traveling from an object into an image on an image capturing element in an appropriate amount at an appropriate timing. The image capturing element is a CMOS image sensor configured to convert, into an electrical signal, light formed into an image via the optical system 207.

The signal processing unit 205 reads out image data generated by the image capturing element of the optical system 207, and performs image processing to adjust the white balance, color, brightness, and the like. The signal processing unit 205 encodes image data having undergone the image processing in accordance with a known encoding format, and records the encoded image data in the secondary storage 202 or external storage medium 210. The signal processing unit 205 decodes image data from an image file recorded on the secondary storage 202 or external storage medium 210, and sends the decoded image data to the display unit 206. The display unit 206 displays a video corresponding to an image signal output from the signal processing unit 205, and a menu screen and various kinds of information for operating the image search apparatuses 101 to 103.

The read only memory 208 is a nonvolatile memory such as a ROM, and stores programs (firmware) to be executed by the CPU of the control unit 203, various kinds of setting information, and the like.

The primary storage 209 is a volatile memory such as a DRAM, stores temporary data, and is used for work by the CPU of the control unit 203.

The external storage medium 210 is a memory card or the like detachable from the apparatus, and stores image files such as still images and moving images shot by the image search apparatuses 101 to 103. The external storage medium 210 can be mounted in a PC or the like to read out image data. That is, the image search apparatuses 101 to 103 suffice to have an access function to the external storage medium 210, and execute readout/write of data from/in the external storage medium 210.

Note that shot image data is stored in the secondary storage 202, but may be stored in the external storage medium 210.

<Object Category Information>

Next, object category information will be explained with reference to FIG. 3. The secondary storage 202 stores, as the object category information, a database in which the person name and category of an object are registered in association with each other.

The object category information includes a person ID 301, person name 302, category 303, and face feature information 304. The person ID 301 is an identifier assigned to each person in order to manage the person serving as an object. The person name 302 is the name of an object person. The person name 302 is referred to in object category determination processing and search condition decision processing (to be described later). The person name 302 is information set by the user of a distribution source apparatus. The category 303 is information representing the relationship between the user of the distribution source apparatus and an object person, and examples of the category 303 are "family" and "friends". Similar to the person name 302, the category 303 is also information set by the user of the distribution source apparatus. The face feature information 304 is face feature information of each object person and is referred to in image search processing (to be described later). Similar to the person name 302, the face feature information 304 is also information set by the user of the distribution source apparatus.

<Distribution Destination User Category Information>

Next, distribution destination user category information will be explained with reference to FIG. 4. The secondary storage 202 stores, as the distribution destination user category information, a database in which the distribution destination ID and category are registered in association with each other.

The distribution destination user category information includes a distribution destination ID 401, person name 402, and category 403. The distribution destination ID 401 is an identifier assigned to each distribution destination in order to manage the distribution destination. The distribution destination ID 401 is received from the distribution destination apparatus and is referred to in distribution destination user category determination processing (to be described later). The person name 402 is the name of a distribution destination user. The person name 402 is information set in advance by the user of a distribution destination apparatus, and is referred to in search condition decision processing (to be described later). The category 403 is information representing the relationship between the user of a distribution source apparatus and a distribution destination user, and examples of the category 403 are "family" and "friends". The category 403 in FIG. 4 and the category 303 in FIG. 3 are the same, and are pieces of information set in advance by the user of the distribution source apparatus.

<Image Distribution Processing>

Next, image distribution processing by the image search apparatus according to the embodiment will be explained with reference to FIG. 5.

Figure 5:
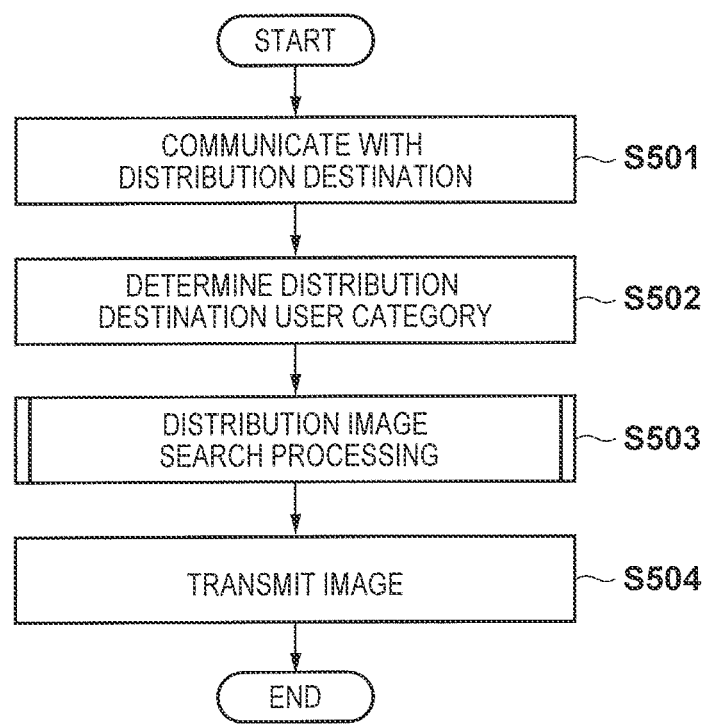
FIG. 5 is a flowchart showing image search processing according to the embodiment.

Note that the processing in FIG. 5 is implemented by loading a program stored in the read only memory 208 into the work area of the primary storage 209, and executing it by the control unit 203.

Step S501 is processing of communicating with a distribution destination apparatus. The control unit 203 controls the communication unit 201 to receive a distribution destination ID and requested object person name from the distribution destination apparatus. If there are a plurality of requested object person names, all of them are received.

Step S502 is distribution destination user category determination processing. The control unit 203 determines the category of the distribution destination user by referring to the distribution destination user category information (FIG. 4) using the distribution destination ID received from the distribution destination apparatus in step S501. For example, when the distribution destination ID is "User001", the control unit 203 determines that the category of the distribution destination user is "family". When the distribution destination ID is "User002", the control unit 203 determines that the category of the distribution destination user is "friends". When the distribution destination ID is "User003", the control unit 203 determines that the category of the distribution destination user is "colleagues".

Step S503 is distribution image search processing. The control unit 203 executes the distribution image search processing (to be described later).

Step S504 is selected-image distribution processing. The control unit 203 transmits a distribution target image selected in step S503 to the distribution destination apparatus.

<Distribution Image Search Processing>

Figure 6:
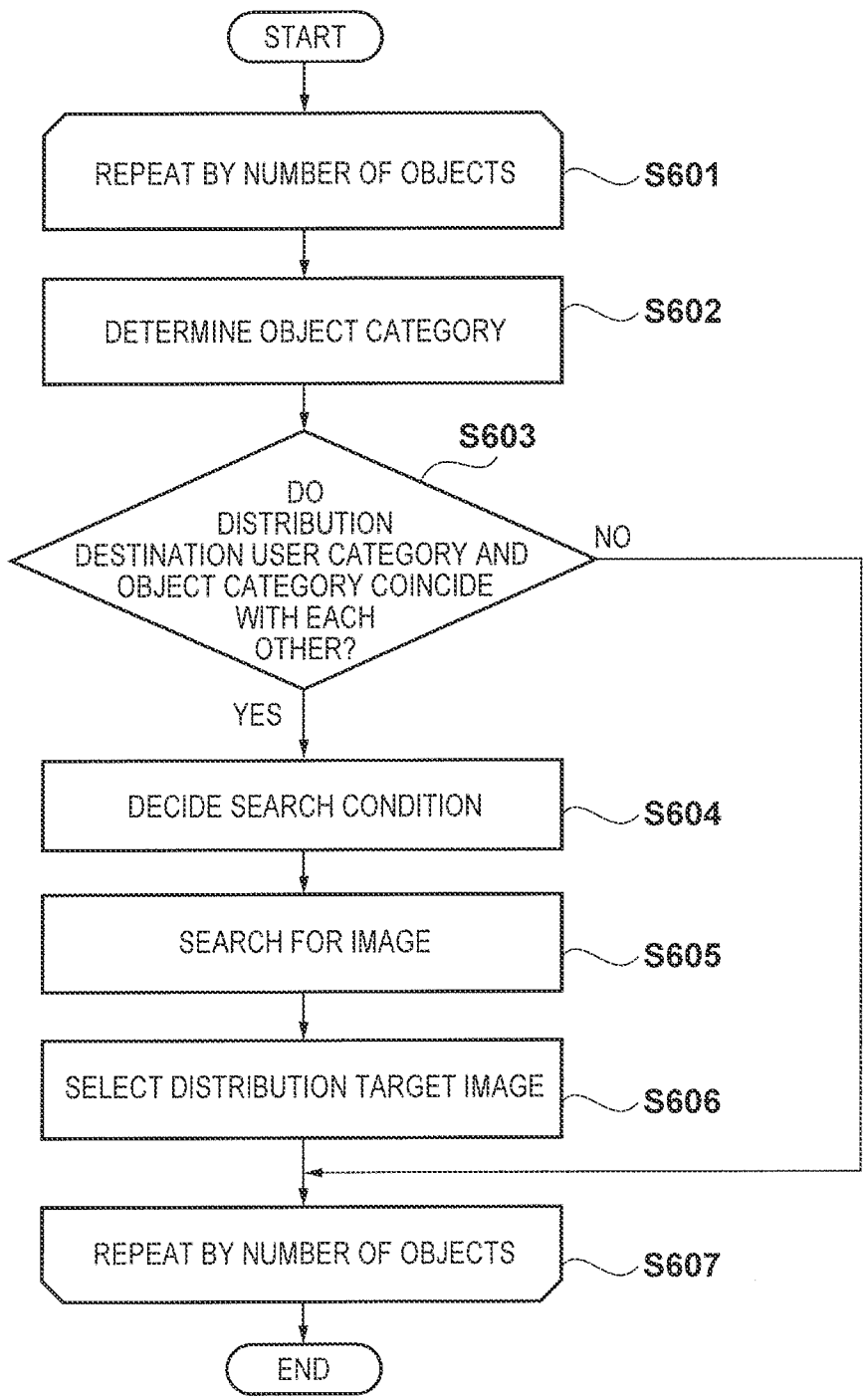
FIG. 6 is a flowchart showing distribution image search processing according to the embodiment.

Next, the distribution image search processing in step S503 of FIG. 5 will be explained with reference to FIG. 6.

The control unit 203 repetitively executes processes in steps S601 to S607 by the number of object person names received in step S501.

Step S602 is object category determination processing. The control unit 203 determines the category of an object person by referring to the object category information (FIG. 3) using the object person name received from the distribution destination apparatus in step S501. For example, if the object person name is "daughter", the control unit 203 determines that the object category is "family".

Step S603 is processing of comparing the object category with the distribution destination user category. The control unit 203 determines whether the distribution destination user category determined in step S502 and the object category determined in step S602 coincide with each other. If these two categories coincide with each other in step S603 (YES in step S603), the control unit 203 advances to step S604. If these two categories do not coincide with each other (NO in step S603), the control unit 203 advances to processing for the next object person without searching for an image of the object person serving as the search target.

Step S604 is search condition decision processing. The control unit 203 decides, as the search condition, an image of the object person requested from the distribution destination apparatus.

Step S605 is image search processing. The control unit 203 searches for an image by using the search condition decided in step S604.

Step S606 is distribution target image selection processing. The control unit 203 selects, as a distribution target image, the image obtained as a result of search in step S605.

First Example

As the first example in the first embodiment, a case in which a distribution destination ID "User001" and an object person name "daughter" are received from a distribution destination apparatus will be described in detail.

In step S502, the control unit 203 refers to distribution destination user category information by using the distribution destination ID "User001", and determines that the distribution destination user category is "family". In step S602, the control unit 203 refers to object category information by using the person name "daughter", and determines that the object category is "family". In step S603, the control unit 203 compares the distribution destination user category "family" with the object category "family", and determines that these two categories coincide with each other. In step S604, the control unit 203 decides that the image search condition is "daughter". In step S605, the control unit 203 refers to the object category information by using the person name "daughter", and searches by using the face feature information 304 for an image whose object is "daughter". In step S606, the control unit 203 selects, as a distribution target image, an image obtained as a result of search in step S605. Then, in step S504, the control unit 203 transmits the image selected in step S606 to the distribution destination apparatus.

Second Example

As the second example in the first embodiment, a case in which a distribution destination ID "User002" and an object person name "daughter" are received from a distribution destination apparatus will be described in detail.

In step S502, the control unit 203 refers to distribution destination user category information by using the distribution destination ID "User002", and determines that the distribution destination user category is "friends". In step S602, the control unit 203 refers to object category information by using the person name "daughter", and determines that the object category is "family". In step S603, the control unit 203 compares the distribution destination user category "friends" with the object category "family", and determines that these two categories do not coincide with each other. In this case, the control unit 203 does not transmit an image in step S504 because no distribution target image is selected.

As described above, according to the first embodiment, an object category and distribution destination user category are compared with each other. Only when these two categories coincide with each other, an image of the requested object is searched for and selected as a distribution target. Therefore, an image reflecting not only the intention of the user of the distribution source apparatus, but also the intention of the user of the distribution destination apparatus can be selected and transmitted.

In the first embodiment, a distribution destination ID is received from the distribution destination apparatus, and a distribution destination user category is determined from the distribution destination ID. However, information capable of specifying a distribution destination, such as an IP address or mail address, may be used.

Second Embodiment

Next, the second embodiment will be described.

According to the second embodiment, in an image sharing system as in the first embodiment, a distribution source apparatus manages a distribution rule corresponding to a distribution destination user category and decides, as the search condition, an image containing an object requested from a distribution destination apparatus in accordance with the distribution rule. Further, the distribution source apparatus executes search for an image by using the decided search condition, and transmits a distribution target image obtained as a result of search to the distribution destination apparatus.

The configurations of the image sharing system and image search apparatus, object category information, and distribution destination user category information according to the second embodiment are the same as those in FIGS. 1 to 4 according to the first embodiment, and a description thereof will not be repeated.

<Distribution Rule Information>

First, distribution rule information used to decide a search condition in the second embodiment will be explained with reference to FIG. 7. A secondary storage 202 stores, as the distribution rule information, a database in which the distribution destination user category and distribution rule are registered in association with each other.

The distribution rule information includes a rule ID 701, category 702, and distribution rule 703, and each piece of information is referred to in search condition decision processing (to be described later). The rule ID 701 is an identifier assigned to each distribution rule in order to manage the distribution rule. The category 702 is information representing the relationship between the user of a distribution source apparatus and a distribution destination user, and examples of the category 702 are "family" and "friends". The category 702 and the category 403 in FIG. 4 according to the first embodiment are the same. The distribution rule 703 is an image distribution rule, and is referred to in search condition decision processing (to be described later). The distribution rule 703 is information set in advance by the user of the distribution source apparatus.

<Image Distribution Processing>

Image distribution processing according to the second embodiment is the same as that in FIG. 5 according to the first embodiment except for distribution image search processing in step S503, and a description thereof will not be repeated.

<Distribution Image Search Processing>

Figure 8:
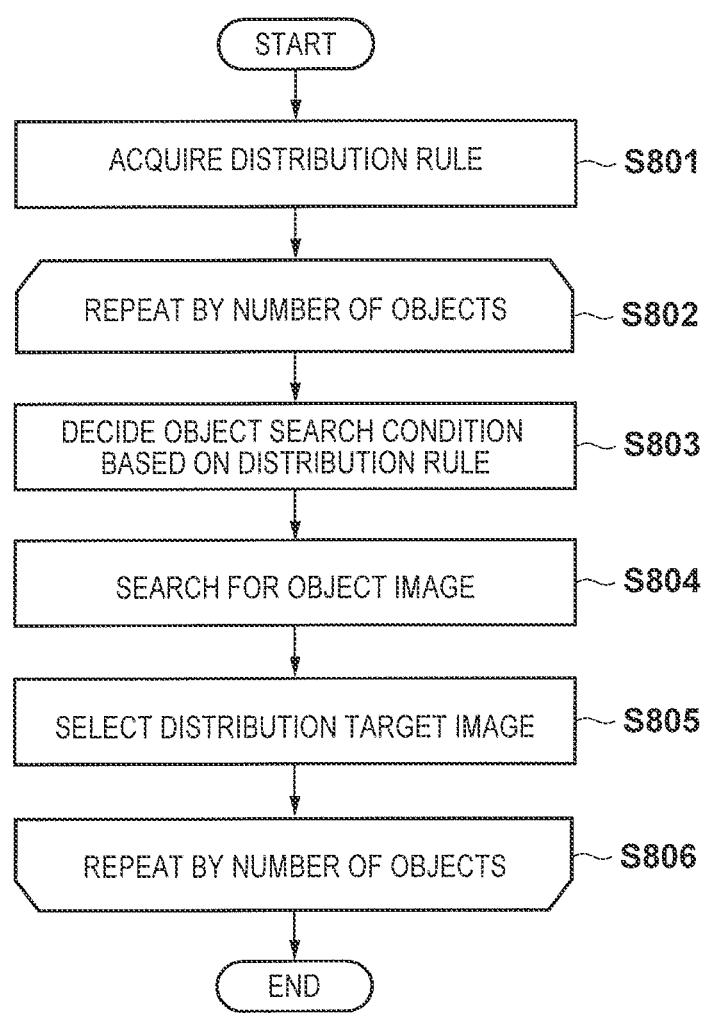
FIG. 8 is a flowchart showing distribution image search processing according to the second embodiment.

Next, distribution image search processing according to the second embodiment to be executed in step S503 of FIG. 5 will be explained with reference to FIG. 8.

Step S801 is distribution rule acquisition processing. A control unit 203 acquires distribution rule information by using the category of a distribution destination user determined in step S502. If the distribution destination user category is "family", the control unit 203 acquires "All" as the distribution rule. If the distribution destination user category is "friends", the control unit 203 acquires "distribution destination user AND object".

The control unit 203 repetitively executes processes in steps S802 to S806 by the number of object person names received in step S501.

Step S803 is search condition decision processing. The control unit 203 decides an image search condition in accordance with the distribution rule acquired in step S801. If the distribution rule is "All", an image containing an object requested from a distribution destination apparatus is decided as the search condition. If the distribution rule is "distribution destination user AND object", an image containing both the distribution destination user and a requested object is decided as the search condition. Further, if the distribution rule is "distribution destination user category=object category", an image containing a requested object is decided as the search condition only when the distribution destination user category and object category coincide with each other.

Step S804 is image search processing. The control unit 203 searches for an image by using the search condition decided in step S803.

Step S805 is distribution image selection processing. The control unit 203 selects, as a distribution target image, the image obtained as a result of search in step S804.

First Example

As the first example in the second embodiment, a case in which a distribution destination ID "User001" and an object person name "ΔΔ" are received from a distribution destination apparatus will be described in detail.

In step S502, the control unit 203 refers to distribution destination user category information by using the distribution destination ID "User001", and determines that the distribution destination user category is "family". In step S801, the control unit 203 acquires the distribution rule "All" by using the distribution destination user category "family". In step S803, the control unit 203 decides "ΔΔ" as the image search condition by using the distribution rule "All". In step S804, the control unit 203 refers to the object category information by using the person name "ΔΔ", and searches by using face feature information 304 for an image whose object is "ΔΔ". In step S805, the control unit 203 selects, as a distribution target image, an image obtained as a result of search in step S804. Then, in step S504, the control unit 203 transmits, to the distribution destination apparatus, the image which has been selected in step S805 and contains "ΔΔ" as an object.

Second Example

As the second example in the second embodiment, a case in which a distribution destination ID "User002" and an object person name "ΔΔ" are received from a distribution destination apparatus will be described in detail.

In step S502, the control unit 203 refers to distribution destination user category information by using the distribution destination ID "User002", and determines that the distribution destination user category is "friends". In step S801, the control unit 203 acquires the distribution rule "distribution destination user AND object" by using the distribution destination user category "friends". In step S803, the control unit 203 decides, as the search condition, an image containing both the user of the distribution source apparatus and the object "ΔΔ". In step S804, the control unit 203 acquires a person name "○○" by referring to the distribution destination user category information using the distribution destination ID "User002". Further, the control unit 203 refers to object category information by using the person names "ΔΔ" and "○○", and searches by using the face feature information 304 for an image whose objects are both "ΔΔ" and "○○". In step S805, the control unit 203 selects, as a distribution target image, an image obtained as a result of search in step S804. Then, in step S504, the control unit 203 transmits, to the distribution destination apparatus, the image which has been selected in step S805 and contains both "ΔΔ" and "○○" as objects.

Third Example

As the third example in the second embodiment, a case in which a distribution destination ID "User003" and an object person name "◊◊" are received from a distribution destination apparatus will be described in detail.

In step S502, the control unit 203 refers to distribution destination user category information by using the distribution destination ID "User003", and determines that the distribution destination user category is "colleagues". In step S801, the control unit 203 acquires the distribution rule "distribution destination user category=object category" in distribution rule acquisition processing by using the distribution destination user category "colleagues". In step S803, to determine the distribution destination user category and object category, first, the control unit 203 refers to object category information based on the object person name "◇◇", and determines that the object category is "colleagues". Then, the control unit 203 compares the distribution destination user category "colleagues" with the object category "colleagues", and determines that these two categories coincide with each other. The control unit 203 decides, as the search condition, an image whose object is "◇◇". In step S804, the control unit 203 refers to the object category information by using the person name "◇◇", and searches by using the face feature information 304 for an image whose object is "◇◇". In step S805, the control unit 203 selects, as a distribution target image, an image obtained as a result of search in step S804. Then, in step S504, the control unit 203 transmits, to the distribution destination apparatus, the distribution target image selected in step S805.

As described above, according to the second embodiment, an image of an object requested from a distribution destination apparatus is searched for to select a distribution target image in accordance with a distribution rule corresponding to a distribution destination user category. Hence, not only the intention of the user of the distribution source apparatus, but also the intention of the distribution destination user can be reflected.

Third Embodiment

Next, the third embodiment will be described.

According to the third embodiment, in an image sharing system as in the first embodiment, a distribution source apparatus manages a distribution rule corresponding to a distribution destination user category and decides an image search condition in accordance with the distribution rule. Further, the distribution source apparatus executes search for an image by using the decided search condition, and transmits a distribution target image obtained as a result of search to a distribution destination apparatus. The third embodiment is different from the second embodiment in that object category information and distribution rule information include an object other than a person.

The configurations of the image sharing system and image search apparatus, and distribution destination user category information according to the third embodiment are the same as those in FIGS. 1, 2, and 4 according to the first embodiment, and a description thereof will not be repeated.

<Object Category Information>

First, object category information will be explained with reference to FIG. 9. A secondary storage 202 stores, as the object category information, a database in which object names including persons and objects other than persons, and categories are registered in association with each other.

The object category information includes an object ID 901, object name 902, category 903, and feature information 904. The object ID 901 is an identifier assigned to each object in order to manage the object. The object name 902 is the name of an object, and is referred to in object category determination processing and search condition decision processing (to be described later). When the object is a person, the category 903 is information representing the relationship between the user of a distribution source apparatus and the object person, and examples of the category 903 are "family" and "friends". When the object is not a person, the category 903 is information representing the type of object, and an example of the category 903 is "landscape". Similar to the object name 902, the category 903 is also information set by the user of the distribution source apparatus. The feature information 904 is feature information of each object and is referred to in distribution image search processing (to be described later). Similar to the object name 902, the feature information 904 is also information set by the user of the distribution source apparatus.

<Distribution Rule Information>

Next, distribution rule information used to decide a search condition according to the third embodiment will be explained with reference to FIG. 10. The secondary storage 202 stores, as the distribution rule information, a database in which the distribution destination user category and distribution rule are registered in association with each other.

The distribution rule information includes a rule ID 1001, category 1002, and distribution rule 1003, and each piece of information is referred to in search condition decision processing (to be described later). The rule ID 1001 is an identifier assigned to each distribution rule in order to manage the distribution rule. When the object is a person, the category 1002 is information representing the relationship between the user of a distribution source apparatus and the object person, and examples of the category 1002 are "family" and "friends". When the object is not a person, the category 1002 is information representing the type of object, and an example of the category 1002 is "landscape". The category 1002 in FIG. 10 and the category 903 in FIG. 9 are the same. The distribution rule 1003 is an image distribution rule, and is referred to in search condition decision processing (to be described later). The distribution rule 1003 is information set in advance by the user of the distribution source apparatus.

<Image Distribution Processing>

Image distribution processing according to the third embodiment is the same as that in FIG. 5 according to the first embodiment except for distribution image search processing in step S503, and a description thereof will not be repeated.

<Distribution Image Search Processing>

Next, distribution image search processing according to the third embodiment to be executed in step S503 of FIG. 5 will be explained with reference to FIG. 11.

A control unit 203 repetitively executes processes in steps S1101 to S1107 by the number of object person names received in step S501.

Step S1102 is object category determination processing. The control unit 203 determines an object category by referring to object category information using an object name received from a distribution destination apparatus in step S501. If the object name is "daughter", the control unit 203 determines that the object category is "family". If the object name is "Mt. Fuji", the control unit 203 determines that the object category is "landscape".

Step S1103 is distribution rule acquisition processing. The control unit 203 acquires a distribution rule by using the object category determined in step S1102. If the object category is "family", the control unit 203 acquires "distribution destination user AND object". If the object category is "landscape", the control unit 203 acquires "All".

Step S1104 is search condition decision processing. The control unit 203 decides an image search condition in accordance with the distribution rule acquired in step S1103. If the distribution rule is "All", the control unit 203 decides, as the search condition, an image containing an object requested from the distribution destination apparatus. If the distribution rule is "distribution destination user AND object", the control unit 203 decides, as the search condition, an image containing both the distribution destination user and a requested object.

Step S1105 is image search processing. The control unit 203 searches for a distribution target image by using the search condition decided in step S1104.

Step S1106 is distribution image selection processing. The control unit 203 selects, as a distribution target image, the image obtained as a result of search in step S1105.

Example

As an example in the third embodiment, a case in which a distribution destination ID "User002" and object names "daughter" and "Mt. Fuji" are received from a distribution destination apparatus will be described in detail.

In step S1102, the control unit 203 refers to object category information by using the object name "daughter", and determines that the object category is "family". In step S1103, the control unit 203 acquires the distribution rule "distribution destination user AND object" by using the object category "family". In step S1104, the control unit 203 decides, as the search condition, an image containing both the distribution destination user and the requested object "daughter" by using the distribution rule "distribution destination user AND object". In step S1105, the control unit 203 acquires a person name "○○" by referring to the distribution destination user category information using the distribution destination ID "User002". Further, the control unit 203 refers to object category information by using the object names "○○" and "daughter", and searches by using the feature information 904 for an image containing both "○○" and "daughter". In step S1106, the control unit 203 selects, as a distribution target image, an image which has been obtained as a result of search in step S1105 and contains both "○○" and "daughter".

Thereafter, in step S1102, the control unit 203 refers to object category information by using the object name "Mt. Fuji", and determines that the object category is "landscape". In step S1103, the control unit 203 acquires the distribution rule "All" by using the object category "landscape". In step S1104, the control unit 203 decides, as the search condition, an image of the requested object by using the distribution rule "All". In step S1105, the control unit 203 refers to object category information by using the object name "Mt. Fuji", and searches by using the feature information "Mount Fuji, Mt. Fuji" for an image in which feature information is added to metadata of the image file. In step S1106, the control unit 203 selects, as distribution target images, an image which has been obtained as a result of search and contains both "○○" and "daughter", and an image of "Mt. Fuji". In step S504, the control unit 203 transmits, to the distribution destination apparatus, the image which has been selected in step S805 and contains both "○○" and "daughter", and the image of "Mt. Fuji".

As described above, according to the third embodiment, an image of an object requested from a distribution destination apparatus is searched for to select a distribution target image in accordance with a distribution rule corresponding to an object category. Thus, not only the intention of the user of the distribution source apparatus, but also the intention of the distribution destination user can be reflected.

The above-described embodiments have exemplified an apparatus which distributes an image detected based on a request from a distribution destination apparatus, but the present invention is not limited to this. For example, the present invention is also applicable to an apparatus which browses an image on a computer, smartphone, digital camera, and the like.

This apparatus is also usable in image search for image browsing, in addition to image search for image distribution. More specifically, a browsing user who is to browse an image by using the image search apparatus is specified by a function such as a camera or manual input. Category information associated with the object of an image, and category information associated with the browsing user are stored and managed in a memory. Then, an object serving as a search target is set. A category associated with the set object and a category associated with the browsing user are compared to decide an image search condition.

Similar to the description of the embodiments, it is also possible to set a rule for each category, and set whether to enable image search, a search condition, a browsing condition, and a distribution condition in accordance with the rule. For example, the display size may be set in accordance with the category as the browsing condition, and whether to enable an image operation such as copying, printing, or transfer to the outside may be set. Needless to say, the distribution condition may be set, as in the above-described embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-111333, filed May 27, 2013 which is hereby incorporated by reference herein in its entirety.

What is claimed is:

1. An image search apparatus which searches for an image containing an object requested from a distribution destination apparatus, comprising:
   a processor; and
   a memory storing a program which, when executed by the processor, causes the image search apparatus to function as:

a management unit configured to manage a first associated information in which an object of an image owned by the image search apparatus is associated with a category and a second associated information in which a user of the distribution destination apparatus is associated with a category, respectively;

a reception unit configured to receive, from the distribution destination apparatus, user information about the user of the distribution destination apparatus, and object information about the requested object;

a user category determination unit configured to determine, based on the user information received by the reception unit and the second associated information, a distribution destination user category to which the user of the distribution destination apparatus belongs;

an object category determination unit configured to determine, based on the object information received by the reception unit and the first associated information, an object category to which the object requested from the distribution destination apparatus belongs;

a comparison unit configured to determine whether the distribution destination user category coincides with the object category; and an image search unit configured to search for an image based on a search condition as the requested object from the distribution destination apparatus in case where the distribution destination user category coincides with the object category, and not to search for the image based on the requested object in case where the distribution destination user category does not coincide with the object category, wherein the reception unit is capable of receiving one user information and a plurality of object information from the distribution destination apparatus, the object category determination unit determines the object category for each of the object information in case where the plurality of object information are received, the comparison unit determines whether each of the object categories determined by the object category determination unit coincides with the distribution destination user category corresponding to the one user information, and the image search unit searches for the image in accordance with the determination result of the comparison unit.

2. The apparatus according to claim 1, wherein the management unit includes a distribution rule management unit configured to manage information about a distribution rule corresponding to the distribution destination user category.

3. The apparatus according to claim 2, wherein the object includes a person and an object other than a person, and the distribution rule includes a distribution rule that one of an image containing a requested object, and an image containing a distribution destination user and an object is used as a search condition.

4. The apparatus according to claim 1, wherein the management unit includes a distribution rule management unit configured to manage information about a distribution rule corresponding to the object category.

5. The apparatus according to claim 1, wherein the processor further causes the image search apparatus to function as a transmission unit configured to transmit an image detected by the image search unit to the distribution destination apparatus which has requested the object.

6. The apparatus according to claim 1, wherein information about the object category includes a name, a category, and feature information for each object, and information about the distribution destination user category includes a name and a category for each user of the distribution destination apparatus.

7. An image search method of searching for an image containing an object requested from a distribution destination apparatus by using object category information for managing a first associated information in which an object of an image is associated with a category, and distribution destination user category information for managing a second associated information in which a user of the distribution destination apparatus is associated with a category, the method comprising:

a reception step of receiving, from the distribution destination apparatus, user information about the user of the distribution destination apparatus, and object information about the requested object;

a user category determination step of determining, based on the user information received in the reception step and the second associated information, a distribution destination user category to which the user of the distribution destination apparatus belongs;

an object category determination step of determining, based on the object information received in the reception step and the first associated information, an object category to which the object requested from the distribution destination apparatus belongs;

a comparison step of determining whether the distribution destination user category coincides with the object category; and an image search step of searching for an image based on a search condition as the requested object from the distribution destination apparatus in case where the distribution destination user category coincides with the object category, and not to search for the image based on the requested object in case where the distribution destination user category does not coincide with the object category, wherein in the reception step, one user information and a plurality of object information from the distribution destination apparatus are received, in the object category determination step, the object category for each of the plurality of object information are determined, in the comparison step, whether each of the object categories determined in the object category determination step coincides with the distribution destination user category corresponding to the one user information, and in the image searching step, the image in accordance with the determination result of the comparison step is searched.

8. A non-transitory computer-readable storage medium storing a program for causing a computer to execute the method according to claim 7.

9. A system which searches for an image containing an object requested from a distribution destination apparatus, and transmits an image obtained as a result of search to the distribution destination apparatus, wherein an image search apparatus serving as a distribution source includes:

a processor, and a memory storing a program which, when executed by the processor, causes the image search apparatus to function as:
- a management unit configured to manage a first associated information in which an object of an image owned by the image search apparatus is associated with a category and a second associated information in which a user of the distribution destination apparatus is associated with a category, respectively;
- a reception unit configured to receive, from the distribution destination apparatus, user information about the user of the distribution destination apparatus, and object information about the requested object;
- a user category determination unit configured to determine, based on the user information received by the reception unit and the second associated information, a distribution destination user category to which the user of the distribution destination apparatus belongs;
- an object category determination unit configured to determine, based on the object information received by the reception unit and the first associated information, an object category to which the object requested from the distribution destination apparatus belongs;
- a comparison unit configured to determine whether the distribution destination user category coincides with the object category; and
- an image search unit configured to search for an image based on a search condition as the requested object from the distribution destination apparatus in case where the distribution destination user category coincides with the object category, and not to search for the image based on the requested object in case where the distribution destination user category does not coincide with the object category, wherein the reception unit is capable of receiving one user information and a plurality of object information from the distribution destination apparatus, the object category determination unit determines the object category for each of the object information in case where the plurality of object information are received, the comparison unit determines whether each of the object categories determined by the object category determination unit coincides with the distribution destination user category corresponding to the one user information, and the image search unit searches for the image in accordance with the determination result of the comparison unit, and the distribution destination apparatus includes:

a processor; and a memory storing a program which, when executed by the processor, causes the distribution destination apparatus to function as:
- a transmission unit configured to transmit information about the user of the distribution destination apparatus and information about the requested object; and
- a reception unit configured to receive the image obtained as a result of search by the image search unit of the image search apparatus.

* * * * *